United States Patent
Kim

Patent Number: 6,163,833
Date of Patent: Dec. 19, 2000

[54] MEMORY MANAGING METHOD FOR USE IN A DATA COMMUNICATIONS SYSTEM

[75] Inventor: Jin Tae Kim, Incheon, Rep. of Korea

[73] Assignee: Daewoo Telecom Ltd., Seo-Gu Incheon, Rep. of Korea

[21] Appl. No.: 09/223,009

[22] Filed: Dec. 30, 1998

[30] Foreign Application Priority Data

Dec. 31, 1997 [KR] Rep. of Korea ............ 97-81713
Dec. 31, 1997 [KR] Rep. of Korea ............ 97-81714

[51] Int. Cl.7 .................................. G06F 13/00
[52] U.S. Cl. .................... 711/171; 711/170; 711/154; 711/156; 710/52
[58] Field of Search ........................ 711/170, 171, 711/154, 156, 149, 172; 365/230.05; 710/52, 56, 57

[56] References Cited

U.S. PATENT DOCUMENTS

| | | | |
|---|---|---|---|
| 5,651,136 | 7/1997 | Denton et al. | 711/118 |
| 5,784,699 | 7/1998 | McMahon et al. | 711/171 |
| 5,822,562 | 10/1998 | Dahlen et al. | 711/170 |
| 5,893,926 | 4/1999 | Saxena et al. | 711/170 |
| 5,991,859 | 11/1999 | Nagasawa et al. | 711/170 |
| 6,006,294 | 12/1999 | Kurihara | 710/52 |
| 6,088,777 | 7/2000 | Sorber | 711/171 |

*Primary Examiner*—Do Hyun Yoo
*Assistant Examiner*—Hong Kim
*Attorney, Agent, or Firm*—Bacon & Thomas, PLLC

[57] ABSTRACT

A method effectively stores data onto each of buffers included in a storage device of a processor, wherein the data is data being communicated between the processor and each of devices coupled thereto. It is first checked whether or not a flag is set to a target buffer among the buffers. If not, it is further checked whether or not a length of the data to be stored is larger than a predetermined length based on head information of the data. The data and the head information are stored onto the target buffer if the data length is not larger than the predetermined length and a flag is set to the target buffer. But, if the data length is larger than the predetermined length, the data is processed to store it onto two or more buffers.

8 Claims, 7 Drawing Sheets

MEMORY MANAGING METHOD FOR USE IN A DATA COMMUNICATIONS SYSTEM

FIELD OF THE INVENTION

The present invention relates to a data communications system; and, more particularly, to a method for effectively managing a memory coupled between a processor and a plurality of devices included in the system.

BACKGROUND OF THE INVENTION

In an electronic switching system (ESS) comprising a large number of processors, use of a hierarchical processor architecture is gaining popularity. For example, an access switching subsystem performing such functions as scanning, interfacing and time switching, included in the ESS, has the hierarchical processor architecture. In the hierarchical processor architecture of the access switching subsystem, the functions of processors are divided into, e.g., two hierarchies, upper and lower. The upper hierarchical function is performed by a main processor (MP), whereas the lower hierarchical function is performed by a peripheral processor (PP).

The PP, as is well know in the art, performs simple processing operations, such as supervising telephony devices, e.g., a subscriber/trunk interface device and a signaling device, and controlling system peripheral devices, e.g., a magnetic tape driver, a disk driver and a CRT (cathode ray tube) terminal. For instance, the scanning of the subscriber's hook-off and signal distribution function are handled by the PP. On the other hand, the MP controls the PP to perform call processing and OA&M (operation, administration and maintenance).

To transmit data between the PP and each of the devices, in such a hierarchical architecture, it is necessary to establish a data communications path therebetween. In the access switching subsystem, it is known that a HIT (HDLC(high level data link control) interface time slot) communications processor is used as the data communications path for the efficient data transmission. The HIT communications processor has a master and slave configuration which employs one master processor and three slave processors, each supporting a TDM (time division-multiplexed) interface using an E1/CEPT mode of Europe and being associated with 16 devices.

In addition, there is incorporated a storage device to interface the PP to each of the devices and convey voice messages and/or data and command and status data therebetween. A dual port random access memory (DPRAM) that is relatively expensive is employed as the storage device for storing the data, wherein the DPRAM is composed of a plurality of buffers and has the capacity of storing data of 64 Kbytes. The buffers are classified into two types, i.e., a TX buffer and a RX buffer. On the other hand, most data being communicated between the PP and each of the devices is data related to general call processing whose length is less than 64 bytes. Data excluding the above data is data for call processing related to a signaling number 7 and an integrated service digital network (ISDN), wherein the length of the other data is 500 bytes whose head information is of 8 bytes. In the prior art DPRAM architecture, there are assigned 128 buffers, i.e., 64 TX buffers and 64 RX buffers, each buffer being capable of accommodating data of 508 bytes. Using such a hardware arrangement, the data between the PP and each of the devices can be communicated.

However, in the conventional hierarchical architecture employing a DPRAM, it is designed that one device can communicate with only one buffer and, therefore, it is impossible to store additional data onto the buffer until it is completely cleared, which may result in a communications interrupt between the PP and each of the devices.

SUMMARY OF THE INVENTION

It is, therefore, a primary object of the present invention to provide a method, for use in a data communications system, for managing a memory coupled between a processor and a plurality of devices included in the system by using an efficient memory control technique.

In accordance with one aspect of the present invention, there is provided a data storing method, for use in a data communications system having a processor and a plurality of devices included therein, for storing data onto each of buffers included in a storage device of the processor, the method comprising the steps of:

(a) selecting a target buffer among the buffers;

(b) checking whether or not a flag is set to the target buffer and, if not, determining whether or not the length of the data to be stored is larger than a predetermined length based on head information attached to the data;

(c) storing the data and the head information onto the target buffer if the data length is not larger than the predetermined length and setting a flag to the target buffer; and (d) processing the data, if the data length is larger than the predetermined length, to store it onto two or more buffers inclusive of the target buffer.

In accordance with another aspect of the present invention, there is provided a data reading method, for use in a data communications system having a processor and a plurality of devices included therein, for reading data stored onto each of buffers included in a storage device of the processor, the method comprising the steps of:

(a) selecting a target buffer among the buffers;

(b) checking whether or not a flag is set to the target buffer and, if so, determining whether or not the length of the data stored onto the target buffer is larger than a predetermined length based on head information attached to the data;

(c) reading the data and the head information from the target buffer if the data length is not larger than the predetermined length and deleting the flag set to the target buffer; and (d) processing the data, if the data length is larger than the predetermined length, to read it from two or more buffers inclusive of the target buffer.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
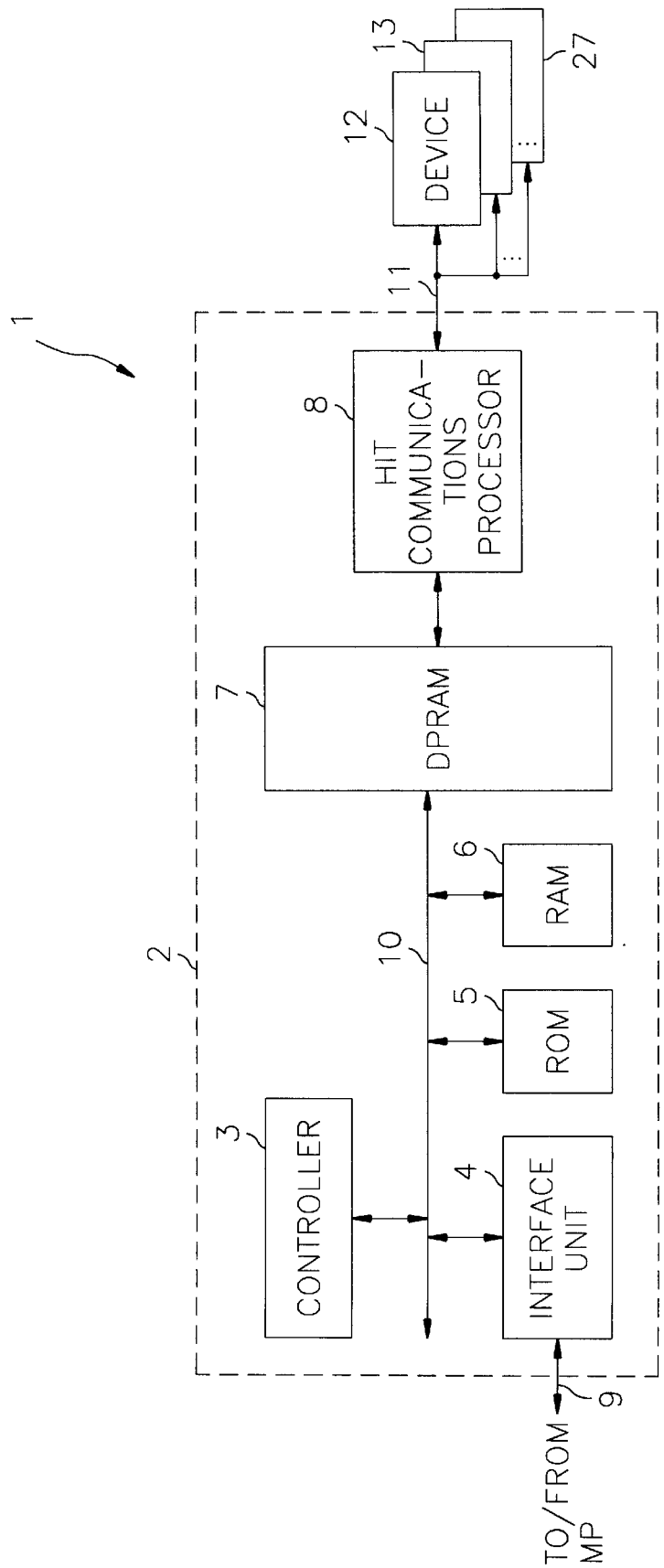
FIG. 1 is a block diagram of an access subsystem processor in accordance with a preferred embodiment of the invention.

Referring to FIG. 1, there is provided a block diagram of a data communications system, e.g., an access switching subsystem (ASS) 1 of an ESS, in accordance with a preferred embodiment of the present invention. The ASS 1 comprises a PP 2 and N devices connected thereto, e.g., 16 devices, 12–27. As shown in FIG. 1, the PP 2 includes a controller 3, an interface unit 4, a read only memory (ROM) 5, an random access memory (RAM) 6, a DPRAM 7 and a HIT communications processor 8. The HIT communications processor 8 actually has a master HIT communications processor and three slave HIT communications processors (not shown). Each of the master and slave HIT communications processors is connected to 16 devices. For the sake of simplicity, in FIG. 1, only one HIT communications processor 8 and 16 devices 12–27 connected thereto are illustratively depicted.

Specifically, the controller 3 controls all the devices incorporated in the PP 2. The interface unit 4 coupled to a global bus 9 serves to interface a main processor (MP) (not shown) to the controller 3 by using an inter-processor communications technique. The ROM 5 stores various programs needed for loading of the PP 2, while the RAM 6 stores data required for writing/reading data onto/from the DPRAM 7. Each processor in the HIT communications processor 8 functions to enable serial data communications between the PP 2 and each of the devices 12–27 via a HIT bus 11 in units of time slots.

The DPRAM 7, connected to both of the controller 3 via a bus 10 and to the HIT communications processor 8, performs data interface and transmission functions. The DPRAM 7 is composed of a plurality of buffers (not shown), the buffers being classified into two kinds, a TX buffer and a RX buffer. In accordance with a preferred embodiment of the invention, each buffer is capable of accommodating a predetermined length of data, e.g., 72 bytes inclusive of head information of 8 bytes. The predetermined data length is decided depending on the concept that most data being communicated between the PP 2 and each of the devices 12–27 has the length of 72 bytes. Therefore, it is possible to assign up to about 800 number of buffers within the DPRAM 7. Data storing/reading operations onto/from each buffer of the DPRAM 7 are performed under the control of the controller 3. Details of all other devices except the DPRAM 7 are omitted here for the sake of brevity since they are not directly related to the subject matter of the invention.

A detailed description of a method in accordance with the invention for storing/reading data onto/from the DPRAM 7 will be provided with reference to FIGS. 1, 2A–2C and 3A–3C hereinafter.

Figure 2A:
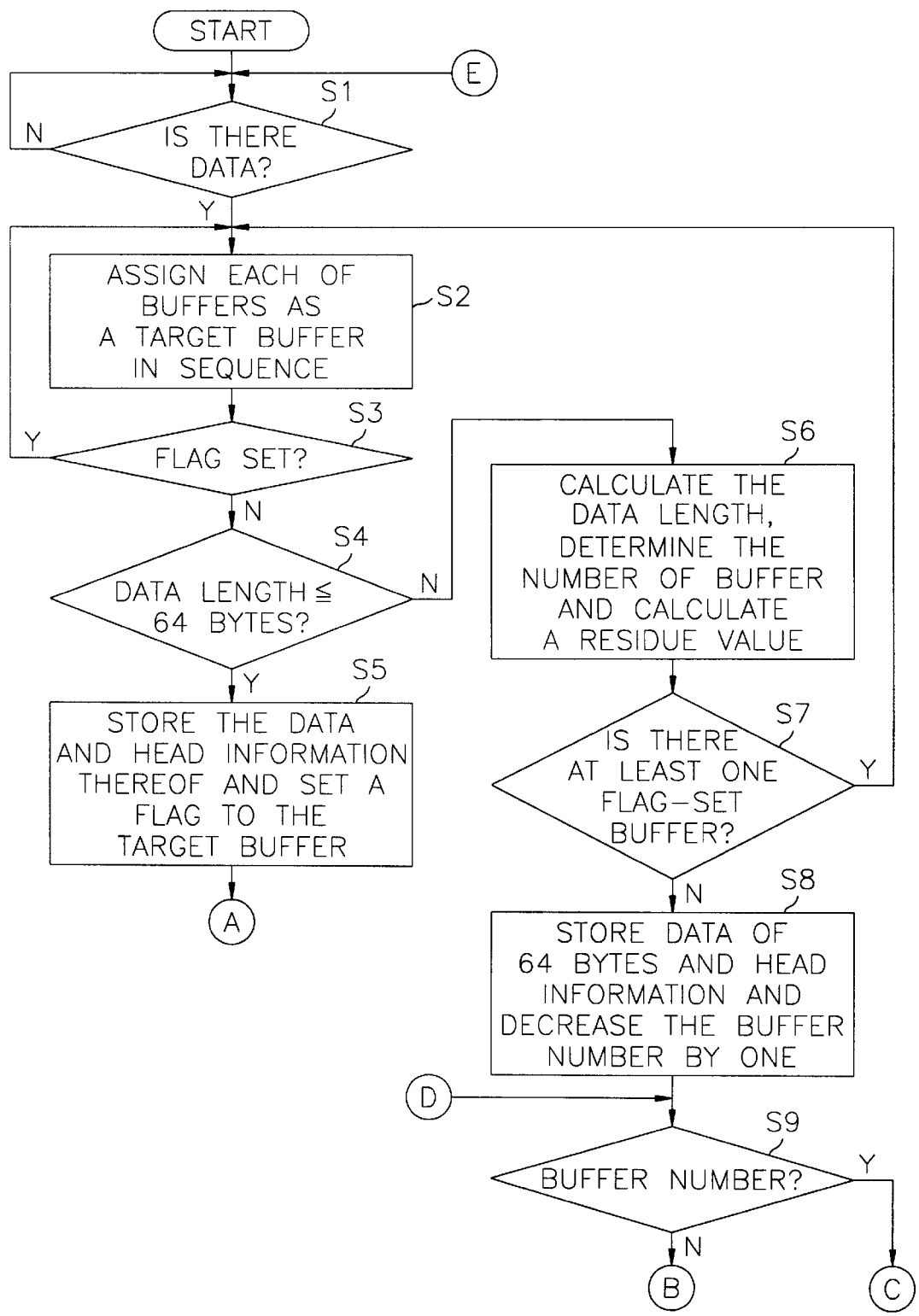
FIGS. 2A–2C show a flow chart for explaining a procedure of storing data onto a buffer included the DPRAM shown in FIG. 1.
Figure 2B:
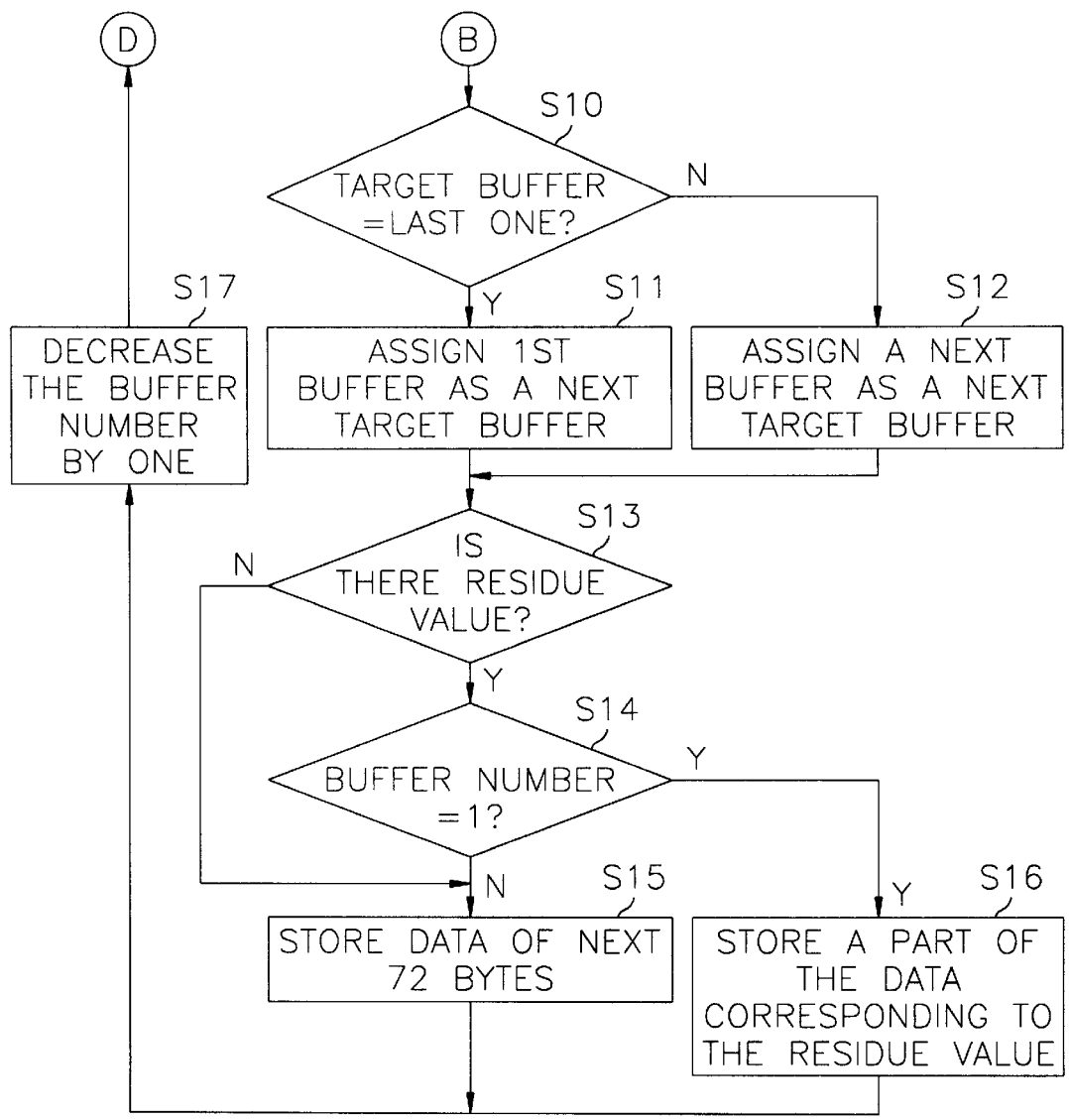
Figure 2C:
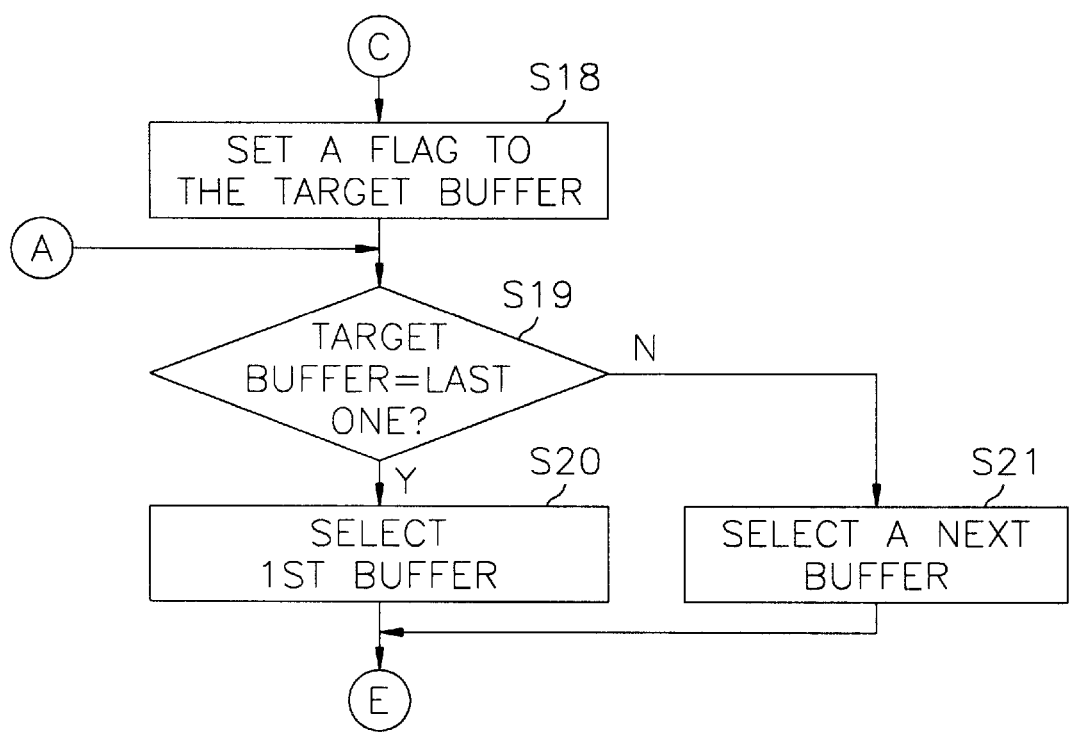

FIGS. 2A–2C explain a procedure of writing or storing data onto each of the buffers included in the DPRAM 7 shown in FIG. 1. A data storing process of the invention may be performed by a software program incorporated in each of the controller 3 and the HIT communications processor 8. Hereinafter, only a process of storing the data from the controller 3 onto a buffer in the DPRAM 7 will be described in detail for the sake of illustration.

As shown in FIG. 2A, the inventive data storing process is initiated at step S1 by checking whether or not there is data from the controller 3 within a predetermined time duration. If it is checked at step S1 that there is some data, the process goes to step S2 and if otherwise, the checking operation is repeatedly performed at step S1 in unit of a predetermined time interval. At step S2, the controller 2 sequentially assigns each of the buffers included in the DPRAM 7 as a target buffer to be processed. In a preferred embodiment of the invention, one of the buffers is first selected by the controller 3 and it is then assigned as the target buffer.

At a next step S3, the controller 3 checks whether or not a flag is set to the target buffer. If so, the process returns to step S2 to repeatedly perform the target buffer assigning process for a next buffer in unit of a predetermined time duration. But, if it is checked at step S3 that the flag is not set to the target buffer, the process goes to step S4 where the controller 3 determines whether or not a length of the data is equal to or smaller than a predetermined length, e.g., 64 bytes. The predetermined length is determined in advance by the controller 3 which takes account of a length of data being communicated in the processor 1.

If it is determined at step S4 that the data length is equal to or smaller than the predetermined length, the process proceeds to step S5, wherein the controller 3 writes or stores the data onto the target buffer together with its head information of 8 bytes and sets, to the target buffer, a flag representing that the data has been written thereonto; and then the process follows to step S19 shown in FIG. 2C through a tap A. However, if the data length is larger than the predetermined length, the process goes to step S6 where the controller 3 calculates the data length based on the head information of the data, determines the number of buffers which is needed to store the data on the basis of the data length calculated, and calculates a residue value. The residue value may be obtained by subtracting 64 bytes from the data length calculated and then by dividing the subtracted value by 72, wherein the number 72 is obtained by adding the head information of 8 bytes to the data of 64 bytes.

At a following step S7, the controller 3 checks whether or not there is at least one flag-set buffer among the buffers, wherein the number of buffers is given by the number calculated at step S6. If the check result is positive, the process returns to step S2 to repeatedly perform the target buffer assigning process for a next buffer. In other words, in case that there is at least one flag-set buffer among the buffers, the controller 3 determines that there occurs abnormal status and again initiates the data storage process at the target buffer assigning step S2. But, if it is checked at step S7 that there is no flag-set buffer, the process proceeds to step S8 where the controller 3 stores the data of 64 bytes and the head information of 8 bytes onto the target buffer and decreases the buffer number by one.

At a next step S9, the controller 3 checks if the buffer number decreased is "0", and if so, the process follows to step S18 shown in FIG. 2C via a tap C, and if not, the process goes to step S10 shown in FIG. 2B via a tap B. At step S10 tapped from the step S9 via the tap B, the controller 3 determines whether or not the target buffer is last one among the buffers obtained by the data length. If the determination result is positive, the process goes to step S11 where the controller 3 assigns a 1st buffer as a next target buffer and, if negative, at step S12 it assigns a next buffer following the target buffer as a next target buffer.

At a following step S13, the controller 3 determines whether or not there exists the reside value. If so, the controller 3 again determines at step S14 whether or not the buffer number decreased is "1", and, if not, the process goes to step S15. If it is determined at step S14 that the buffer number decreased is "1", at a next step S16 the controller 3 stores a part of the data corresponding to the residue value onto either the 1st buffer or the next buffer, which is assigned at the step S11 or S12 and the process goes to step S17. However, if the buffer number decreased is not "1", the process goes to step S15.

In case that either it is checked at step S13 that there is not the residue value or it is determined at step S14 that the buffer number is not "1" although there is the residue value, in accordance with the invention, at step S15 the controller 3 stores, onto either the 1st buffer or the next buffer, data of next 72 bytes following the data of 72 bytes. After performing the storing process at step S15 or S16, at step S17 the controller 3 decreases the buffer number by one and then the process returns to step S9 shown in FIG. 2A via a tap D for checking if the buffer number is "0".

On the other hand, if it is checked at step S9 that the buffer number is "0", at step S18 shown in FIG. 2C being sent through the tap C, the controller 3 sets a flag to the target buffer and the process proceeds to step S19. At step S19 tapped from the step S5 shown in FIG. 2A through the tap A or being sent from the step S18, the controller 3 checks whether or not the target buffer is a last one among the buffers. If the target buffer is the last buffer, the controller 3 selects a 1st buffer out of them, and if otherwise, it selects a next buffer following the target buffer. After performing the process at either step S20 or S21, the inventive process returns to step S1 through a tap E as shown in FIG. 2A to repeatedly perform the process of checking whether or not there is any data. And the selected 1st or next buffer will be used for assigning the target buffer at step S2 as described above.

Figure 3A:
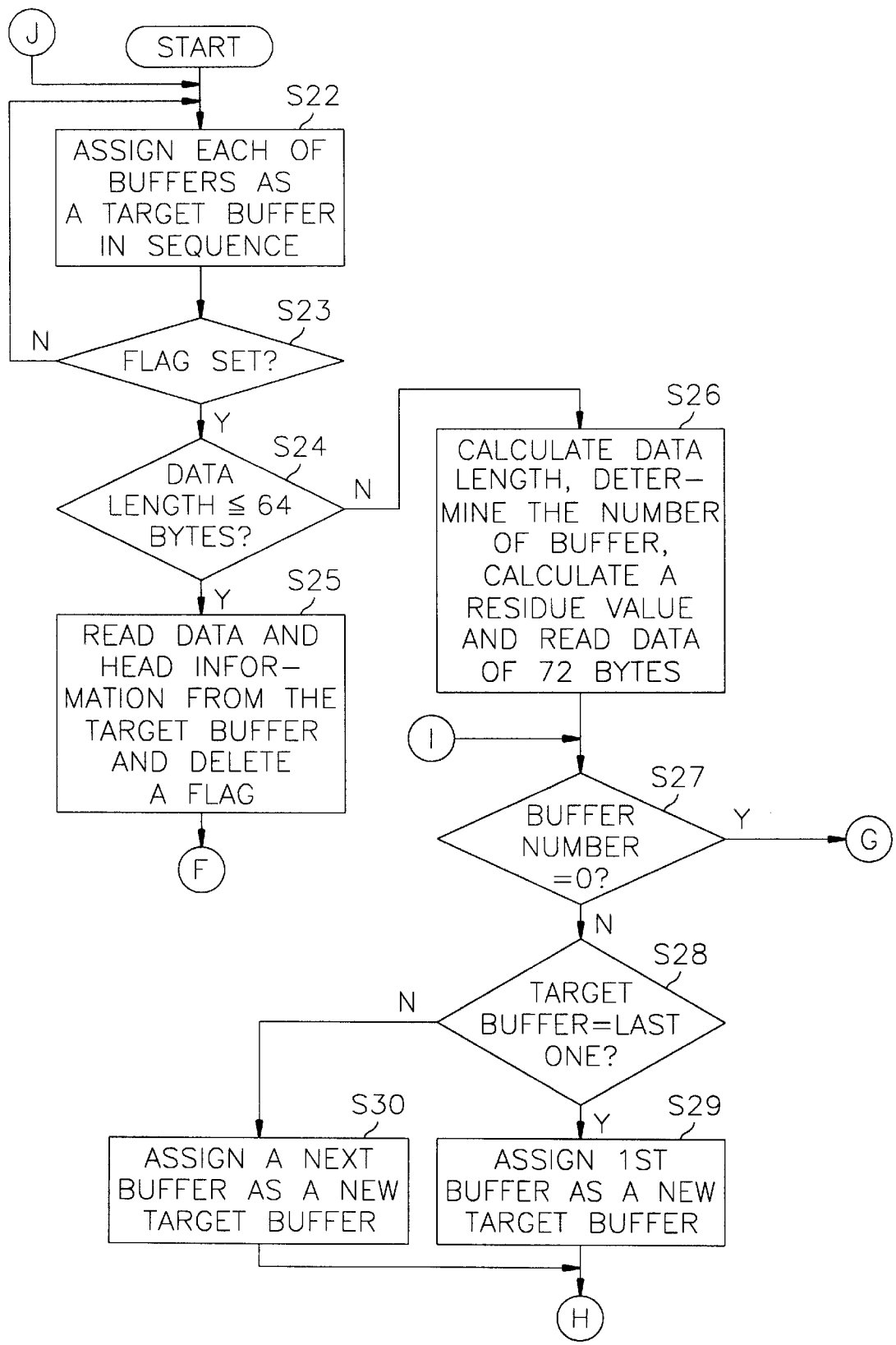
FIGS. 3A–3C present a flow chart for explaining a process of reading data from a buffer in the DPRAM.
Figure 3B:
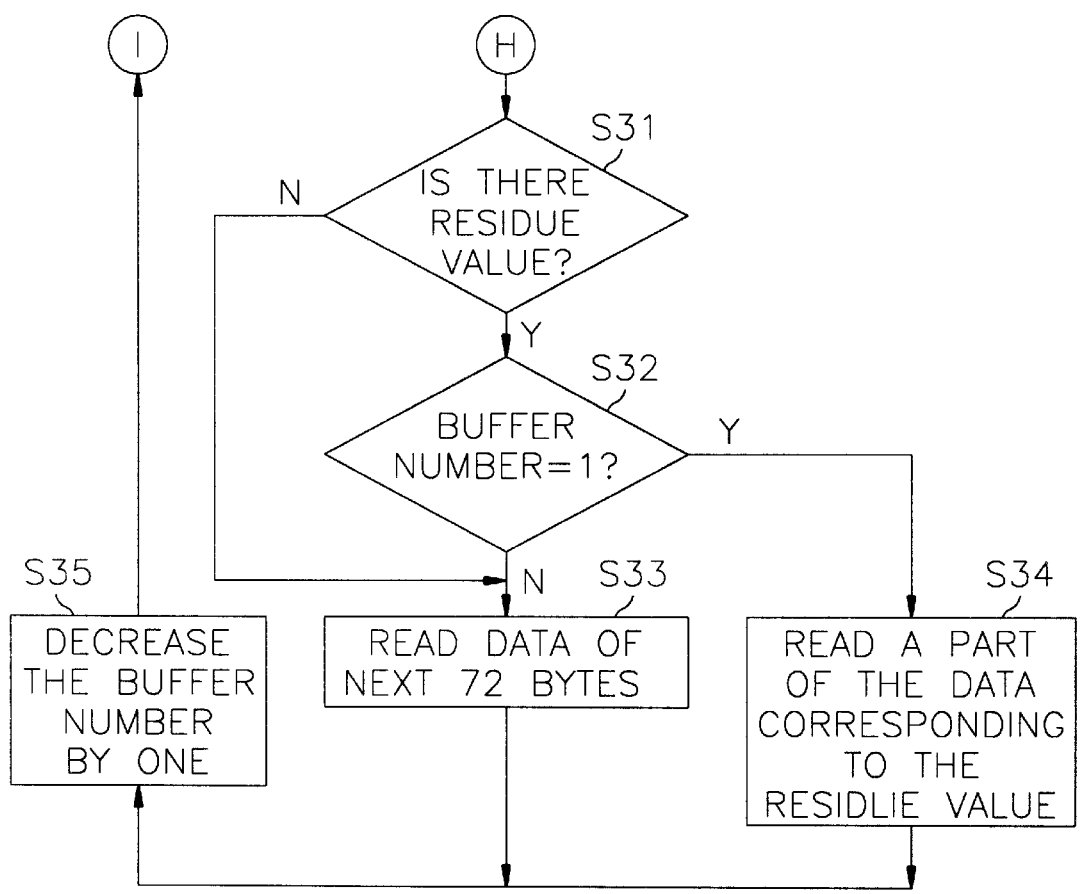
Figure 3C:
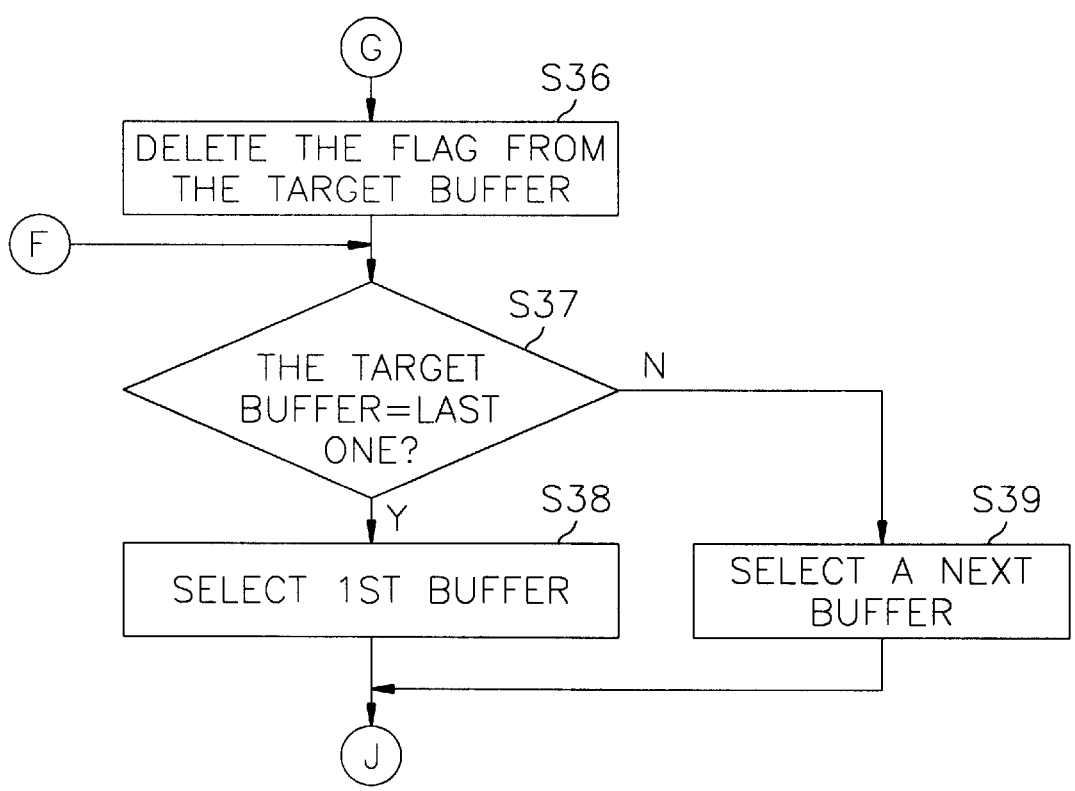

With reference to FIGS. 3A–3C, a procedure of reading data from each of the buffers included in the DPRAM 7 is described in a similar manner hereinafter. A data reading process of the invention may be carried out by a software program incorporated in each of the controller 3 and the HIT communications processor 8. Hereinafter, only a process of reading the data stored onto each of the buffers by the HIT communications processor 8 will be described in detail for the sake of illustration.

As shown in FIG. 3A, the inventive data reading process is initiated at step S22 by sequentially assigning each of the buffers as a target buffer to be processed when desired data has been stored thereonto. As explained above, one of the buffers is first selected by the processor 8 and it is then assigned as a target buffer to be processed on the basis of a buffer preselected by the controller 3, as will be described later. A buffer onto which the desired data has been stored can be found by the processor 8 by sequentially polling the RX buffers within the DPRAM 7 in unit of a predetermined time period and also by taking account of a buffer preselected by the processor 8, as will be described later.

At a following step S23, the processor 8 checks whether or not a flag is set to the target buffer, wherein the flag depicts that any data has been written down or stored onto the target buffer. If it is checked at step S23 that the flag is not set to the target buffer, the process returns to step S22 to repeatedly perform the target buffer assigning process for a next buffer in unit of a predetermined time duration. However, if it is checked that the flag is set to the target buffer, the process proceeds to step S24 where the processor 8 determines whether or not a length of data stored onto the target buffer is equal to or smaller than a predetermined length, e.g., 64 bytes. The predetermined length is determined in advance by the processor 8 based on a length of data being communicated in the processor 1.

If it is determined at step S24 that the data length is equal to or smaller than the predetermined length, the process proceeds to step S25, wherein the controller 3 reads the data from the target buffer together with its head information and deletes, from the target buffer, the flag set thereonto; and then the process follows to step S37 shown in FIG. 3B through a tap F. However, if the data length is larger than the predetermined length, the process goes to step S26 where the processor 8 calculates the data length based on the head information of the data, determines the number of buffers needed for storage of the data on the basis of the data length calculated, calculates a residue value and reads data of 72 bytes inclusive of the head information of 8 bytes. The residue value may be obtained by subtracting 64 bytes from the data length calculated and then by dividing the subtracted value by 72, wherein the number 72 is obtained by adding the head information of 8 bytes to the data of 64 bytes.

At a following step S27, the processor 8 checks whether or not the buffer number is "0". If the check result is positive, the process follows to step S36 shown in FIG. 3C via a tap G, and if otherwise, the process goes to step S28. At step S28, the processor 8 determines whether or not the target buffer is a last one among the buffers calculated above. If so, the process goes to step S29 where the processor 8 assigns a 1st buffer as a next target buffer and, if not, at a next step S30, it assigns a next buffer following the target buffer as a next target buffer.

After performing the target buffer assigning process at either step S29 or S30, step S31 is followed through a tap H as shown in FIG. 3B, wherein the processor 8 determines whether or not there exists the reside value. If the decision result is affirmative, the processor 8 again determines at step S32 whether or not the buffer number is "1", and if otherwise, the process goes to step S33. If it is determined at step S32 that the buffer number is "1", at a next step S34 the processor 8 reads a part of the data corresponding to the residue value from either the 1st buffer assigned at step S29 or the next buffer assigned at step S30 and the process goes to step S35. However, if the buffer number is not "1", the process goes to step S33.

In case that either it is determined at step S31 that there is no residue value or it is decided at step S32 that the buffer number is not "1" although there is the residue value, at step S33 the processor 8 reads, from either the 1st buffer or the next buffer, data of next 72 bytes following the data of 72 bytes. After performing the data reading process at step S33 or S34, at step S35 the processor 8 decreases the buffer number by one and then the process returns to step S27 via a tap I shown in FIG. 3A for checking whether or not the buffer number is "0".

On the other hand, if it is checked at step S27 shown in FIG. 3A that the buffer number is "0", step S36 is followed through a tap G as shown in FIG. 3C, wherein the processor 8 deletes the flag set to the target buffer and the process proceeds to step S37.

At step S37 tapped from the step S25 shown in FIG. 3A through the tap F or being sent from the step S37, the processor 8 checks whether or not the target buffer is a last one among the buffers calculated above. If it is checked that the target buffer is the last buffer, the processor 8 selects a 1st buffer at step S38, and if otherwise, it selects a next buffer following the target buffer at step S39. After performing the buffer selecting process at either step S38 or S39, the inventive data reading process returns to step S22 shown in FIG. 3A through a tap J so that the processor 8 can decide the target buffer when there is found other desired data from any of the buffers.

While the present invention has been shown and described with respect to the particular embodiments, it will be apparent to those skilled in the art that many changes and modifications may be made without departing from the spirit and scope of the invention as defined in the appended claims.

What is claimed is:

1. A data storing method, for use in a data communications system having a processor and a plurality of devices included therein, for storing data onto each of buffers included in a storage device of the processor, the method comprising the steps of:

(a) selecting a target buffer among the buffers;

(b) checking whether or not a flag is set to the target buffer and, if not, determining whether or not the length of the data to be stored is larger than a predetermined length based on head information attached to the data;

(c) storing the data and the head information onto the target buffer if the data length is not larger than the predetermined length and setting a flag to the target buffer; and (d) processing the data, if the data length is larger than the predetermined length, to store it onto two or more buffers inclusive of the target buffer.

2. The method of claim 1, wherein the processing step (d) includes the steps of:

(d1) if the data length is larger than the predetermined length, determining the number of buffers which corresponds to the data length and calculating a residue value; and (d2) storing the data onto the two or more buffers based on the buffer number and the residue value and setting a flag to each of the two or more buffers.

3. The method of claim 2, wherein the storage device is a dual port random access memory (DPRAM).

4. The method of claim 2, wherein the predetermined length is 64 bytes and the head information is 8 bytes.

5. A data reading method, for use in a data communications system having a processor and a plurality of devices included therein, for reading data stored onto each of buffers included in a storage device of the processor, the method comprising the steps of:

(a) selecting a target buffer among the buffers;

(b) checking whether or not a flag is set to the target buffer and, if so, determining whether or not the length of the data stored onto the target buffer is larger than a predetermined length based on head information attached to the data;

(c) reading the data and the head information from the target buffer if the data length is not larger than the predetermined length and deleting the flag set to the target buffer; and (d) processing the data, if the data length is larger than the predetermined length, to read it from two or more buffers inclusive of the target buffer.

6. The method of claim 5, wherein the processing step (d) includes the steps of:

(d1) if the data length is larger than the predetermined length, determining the number of buffers which corresponds to the data length and calculating a residue value; and (d2) reading the data from the two or more buffers based on the buffer number and the residue value and deleting flags set to the two or more buffers.

7. The method of claim 6, wherein the storage device is a dual port random access memory (DPRAM).

8. The method of claim 6, wherein the predetermined length is 64 bytes and the head information is of 8 bytes.

* * * * *